United States Patent [19]

Nosek

[11] Patent Number: 4,967,484
[45] Date of Patent: Nov. 6, 1990

[54] METHOD OF AND APPARATUS FOR MEASURING DISTANCES

[76] Inventor: Frank J. Nosek, 1236 Whitingham Cir., Naperville, Ill. 60541

[21] Appl. No.: 403,768

[22] Filed: Sep. 6, 1989

[51] Int. Cl.$^5$ ............................ G01B 3/12; F16B 7/10
[52] U.S. Cl. ........................................ 33/781; 33/772; 33/780; 33/809; 403/109
[58] Field of Search ................. 33/781, 782, 772, 779, 33/809; 403/214, 105, 367, 83, 97, 109, 164

[56] References Cited

U.S. PATENT DOCUMENTS

| | | | |
|---|---|---|---|
| 2,123,360 | 7/1938 | Harris | 33/781 |
| 2,517,700 | 8/1950 | Odin | 403/367 |
| 2,557,481 | 6/1951 | Staples et al. | 33/782 |
| 3,191,310 | 6/1965 | Carlson et al. | 33/781 |
| 3,515,418 | 6/1970 | Nielsen, Jr. | 403/109 |
| 4,176,458 | 12/1979 | Donn | 33/781 |
| 4,419,026 | 12/1983 | Leto | 403/109 |
| 4,706,367 | 11/1987 | Garringer | 403/109 |

Primary Examiner—William A. Cuchlinski, Jr.
Assistant Examiner—William C. Dowling
Attorney, Agent, or Firm—Wood, Phillips, Mason, Recktenwald & VanSanten

[57] ABSTRACT

A method of and apparatus for measuring distance selectively along any one or more of an outwardly facing subjacent surface, such as a floor surface, a horizontally facing surface, such as a wall surface, and a downwardly facing surface, such as a sealing surface. The measurement is effected by utilizing an extensible mounting member carrying, at one end, a measurement wheel and an associated counter/indicator adapted to be viewed by a person utilizing the device and grasping the opposite end of the mounting member in effecting a rolling movement of the wheel along the surface to be measured. Locking structure is provided for selectively locking sections of the extensible mounting member in an infinite number of different extended dispositions. The mounting member permits the user to effect the different measurements with a single adjusted arrangement of the mounting member or a plurality of different adjusting arrangements as desired. The mounting member is caused to have a length sufficient to permit the measurement of distances along a ceiling surface with the mounting member disposed at an angle to the vertical.

10 Claims, 1 Drawing Sheet

METHOD OF AND APPARATUS FOR MEASURING DISTANCES

TECHNICAL FIELD

This invention relates to a method and apparatus for measuring distances selectively along upwardly facing floor surfaces, horizontally facing wall surfaces, and downwardly facing ceiling surfaces by any one of a plurality of persons having different heights.

BACKGROUND ART

In one conventional form of measuring apparatus, a measuring wheel is provided at one end of an elongated handle so as to be rolled along a subjacent surface, such as for measuring the length of the surface between two points thereon.

It has been found desirable to provide such a wheeled-type measuring device not only for measuring such subjacent surfaces, but also measuring the dimensions of walls and ceilings.

A serious problem arises in the use of the conventional wheeled measuring devices of the prior art in that the fixed length of the handle makes it quite difficult to utilize the measuring wheel in the different applications.

DISCLOSURE OF INVENTION

The present invention comprehends an improved method and apparatus for measuring distances selectively along an upwardly facing subjacent surface, such as a floor surface, a horizontally facing surface, such as a wall surface, and a downwardly facing surface, such as a ceiling surface of a room.

The novel method includes the steps of providing a rotatable measuring wheel having a counter/indicator for displaying the distance the wheel is rolled along a surface, providing a longitudinally adjustably extensible mounting member having a hand grip at one end, and means mounting the measuring wheel and counter/indicator to the opposite end, and rolling the measuring wheel along substantially the entire length of the surface to be measured with the length of the mounting member adjusted to permit measuring the length with the mounting member extending longitudinally from a user's hand gripping the hand grip to the surface to be measured at an angle to the vertical within the range of approximately 45° to 90° to the surface being measured.

The novel apparatus of the present invention includes a rotatable measuring wheel having a counter/indicator for displaying the distance the wheel is rolled along a surface; and a longitudinally adjustably extensible mounting member having a hand grip at one end, and means mounting the measuring wheel and counter/indicator to the opposite end, the apparatus comprising means for permitting rolling the measuring wheel along substantially the entire length of the surface to be measured with the length of the mounting member adjusted to permit measuring the length with the mounting member extending longitudinally from a user's hand gripping the hand grip to the surface to be measured at an angle to the vertical within the range of approximately 45° to 90° to the surface being measured.

In the disclosed invention, the mounting member is adjusted to permit measuring of the height of a horizontally facing wall surface, with the user being substantially at a minimum distance horizontally from the wall surface when the measuring wheel is disposed at the top of the wall and the bottom of the wall.

The invention comprehends that the mounting member be fixedly locked to have a single adjusted length during the entire distance measurement of any one or more of the selective measurements of the floor, wall and ceiling distances.

The invention further comprehends that the step of adjustably locking the length of the mounting member include the step of twisting the mounting member to release the mounting member from a previous locked arrangement, adjusting the length of the released mounting member, and twisting the mounting member to relock it in the newly adjusted arrangement.

Thus, the mounting member comprises means for locking a mounting member to have a desired length during the entire measuring operation and comprises twistable locking means.

In the illustrated embodiment, the mounting member has a fully extended length of at least three feet.

The mounting member defines a longitudinal axis and the hand grip comprises a cylindrical hand grip, in the illustrated embodiment, which permits grasping thereof with the hand grip in any position about the longitudinal axis of the mounting member, whereby the counter/indicator may be suitably disposed for viewing by the user grasping the hand grip with the mounting member locked in a preselected length arrangement.

Thus, the method and apparatus for measuring distances of the present invention are extremely simple and economical, while yet providing the highly desirable features discussed above.

BRIEF DESCRIPTION OF THE DRAWING

Other features and advantages of the invention will be apparent from the following description taken in connection with the acconmpanying drawing wherein.

BEST MODE FOR CARRYING OUT THE INVENTION

Figure 1:
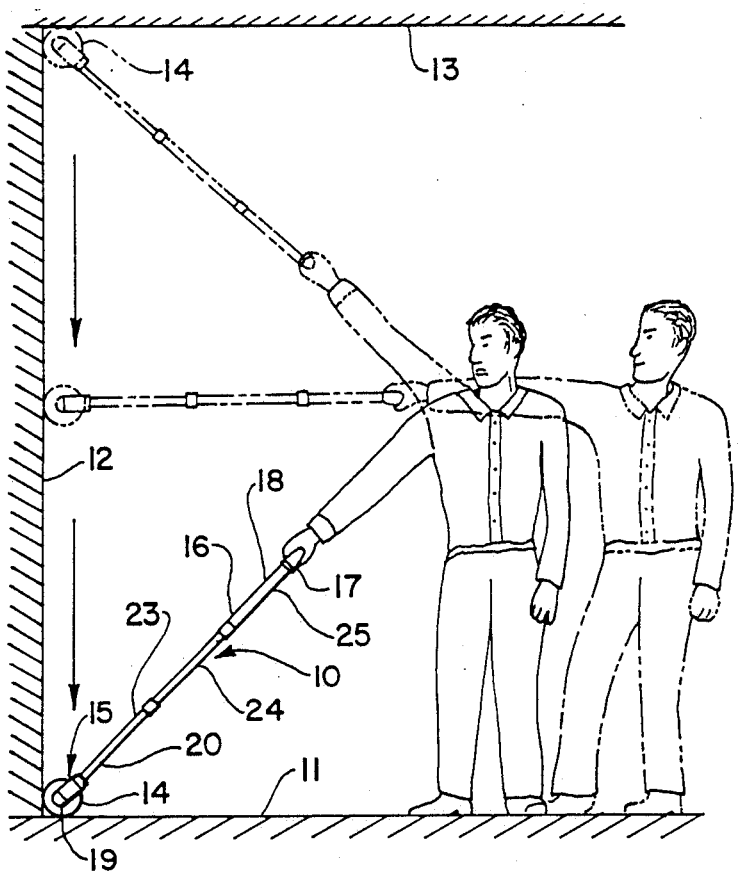
FIG. 1 is a fragmentary elevation showing the method of measuring distances by a measuring means embodying the invention.

In the illustrative embodiment of the invention as disclosed in the drawing, an apparatus generally designated 10 is shown to comprise structure for measuring distances selectively along an upwardly subjacent surface, such as a floor 11, a horizontally facing surface, such as wall surface 12, and a downwardly facing surface, such as ceiling surface 13, illustrated in FIG. 1. The measuring apparatus is adapted to be used by any one of a plurality of persons having different heights in effecting the desired surface measurements.

More specifically, the invention comprehends the provision of such a measuring apparatus 10 including a rotatable measuring wheel 14 having a counter/indicator 15 for displaying the distance said wheel is rolled along a surface. As is well-known in the art, such measuring wheels are adapted to be rolled along a surface, with the associated counter/indicator providing a display of the distance the wheel is rolled along the surface so as to indicate a measurement between preselected points thereon.

The present invention comprehends the further provision of a longitudinally adjustable extensible mounting member generally designated 16 having a hand grip 17 at one end 18 of the mounting member, and means 19 for mounting the measuring wheel 14 and counter/indicator 15 to the opposite end 20 of the mounting member.

Figure 2:
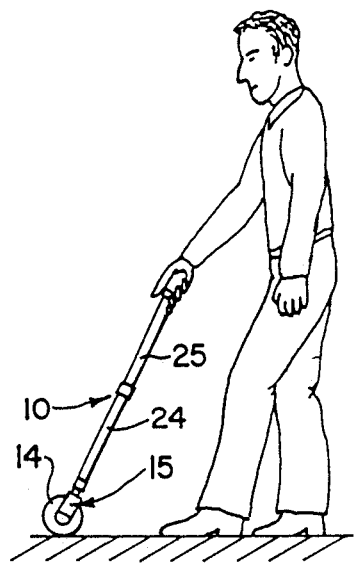
FIG. 2 is an elevation illustrating the use of the measuring apparatus in measuring distances along a subjacent surface.
Figure 3:
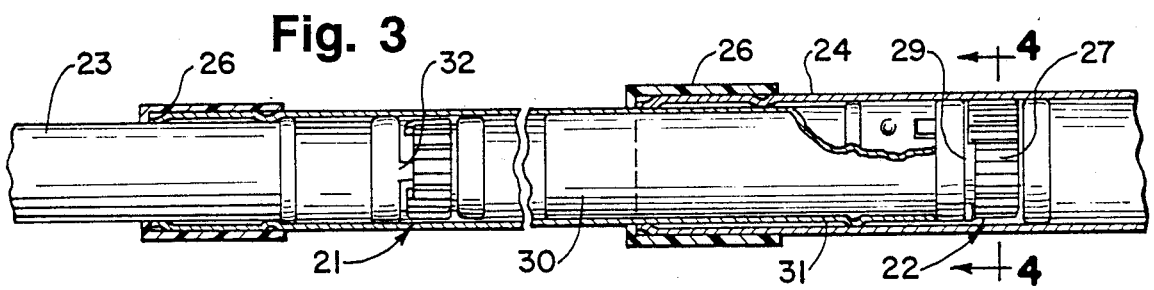
FIG. 3 is a fragmentary enlarged diametric section of the measuring apparatus.

The mounting member includes twistable locking means generally designated 21 and 22 interconnecting a plurality of tubular sections 23, 24 and 25. The tubular sections are telescopically associated so as to permit selective adjustment of the longitudinal extension of the mounting member, as illustrated in FIGS. 1 and 2. The joints between the adjacent sections of the mounting member are covered by tubular sleeves 26.

Figure 4:
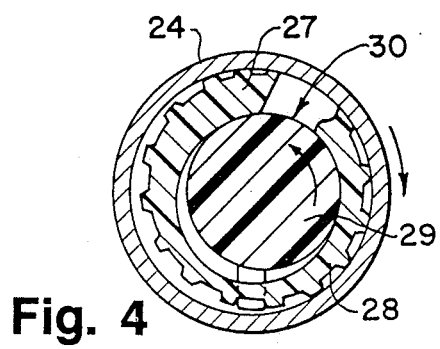
FIG. 4 is a further enlarged cross section taken substantially along the line 4—4, with the locking means shown in the locked arrangement.
Figure 5:
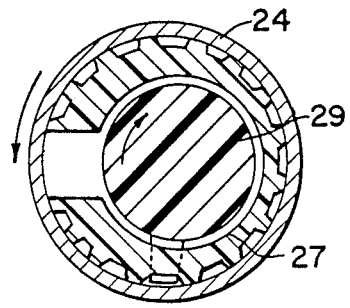
FIG. 5 is a view similar to that of FIG. 4, but with the locking means shown in the released arrangement.

As illustrated in FIGS. 4 and 5, the adjacent tubular sections are selectively locked in a desired extensible arrangement by twisting action of the locking means. As shown, the locking means comprises a C-shaped wedging element 27 having an outer knurled surface 28. The locking member embraces an eccentric cylindrical portion 29 of a rod 30 mounted within one end 31 of the tubular section.

As shown in FIG. 4, a clockwise rotation of the outer section 24 relative to rod 30 causes the C-shaped locking member to be wedged between the rod portion 29 and the inner surface of the section 24, thereby locking the section 24 in the adjusted position by the wedging engagement between the rod portion 29 and tubular section surface.

Thus, the three sections 23, 24 and 25 may be adjustably locked in an infinite number of longitudinally related positions so as to provide an infinite adjustment between the maximum arrangement seen in FIG. 1, and a minimum arrangement wherein the upper sections 24 and 25 are coaxially telescoped about the lowermost section 23.

A stop 32 may be provided for limiting the relative rotation between the sections to slightly less than 360°, whereby facilitated tightening and loosening of the locking means may be readily effected.

The provision of the handle 17 as a symmetrical cylindrical element permits the mounting member to be grasped, as seen in FIGS. 1 and 2, with the counter/indicator 15 suitable disposed for viewing by the user notwithstanding the rotational position of the tubular sections relative to each other in the locked position.

As shown in FIGS. 1 and 2, the measuring apparatus 10 permits the measuring of distances selectively along an upwardly facing subjacent surface, such as the floor 11, a horizontally facing surface, such as the wall surface 12, and a downwardly facing surface, such as the ceiling surface 13, by any one of a plurality of persons having different heights. The use of the improved measuring apparatus 10 permits such selective measurement by permitting the adjustment of the extension of the mounting member commensurate with the user's height and arm length, so that the measurement along the floor surface 11 may be readily effected, with the measuring wheel disposed at a desired position forwardly of the user, as seen in FIG. 2, by suitable adjustment of the extensible mounting member so as to permit the measurement with the mounting member disposed at an angle to the vertical within the range of approximately 45° to 90°.

Similarly, as seen in FIG. 1, the height of the vertical surface 12 may be effectively measured by extending the adjustable member to a sufficient length to reach the upper end of the surface 12, as shown in broken lines, with the user's arm extending at approximately a 45° angle for facilitated accurate measurement. As shown in FIG. 1, the range of angularity of the mounting member to the horizontal may be from approximately 45° upwardly to approximately 45° downwardly, with the mounting member extending substantially perpendicularly to the wall surface 12 in the mid-position.

The invention comprehends utilization of the mounting member in measuring the downwardly facing surface 13 by extending the mounting member sufficiently to permit a measurement with the mounting member extending at the desired angle illustrated in FIG. 2, but reversely upwardly rather than downwardly, as seen in FIG. 2.

It has been found that in many conventional room measurements, a single adjustment of the mounting member may be effected for use in measuring all three of the indicated surfaces, 11, 12 and 13, thus providing further facilitated measurement by means of the apparatus 10.

The telescoping arrangement of the mounting member permits the measuring device to be stored in a compact arrangement wherein the tubular sections are coaxially telescoped.

The method of and apparatus for measuring distances selectively along the indicated different surfaces, of the present invention, is extremely simple and economical of construction, while yet providing for facilitated accurate measurement thereof.

The foregoing disclosure of specific embodiments is illustrative of the broad inventive concepts comprehended by the invention.

I claim:

1. The method of measuring distance selectively along an upwardly facing subjacent surface, a horizontally facing wall surface, and a downwardly facing ceiling surface by any one of a plurality of persons having different heights, said method comprising steps of:

providing a rotatable measuring wheel having a counter/indicator for displaying the distance said wheel is rolled along a surface;

providing a longitudinally adjustably extensible mounting member having a hand grip at one end, and means mounting said measuring wheel and counter/indicator to the opposite end, said mounting member having first and second tubular sections telescopically mated so as to permit selective adjustment of the effective longitudinal extension of the mounting member, said adjacent tubular sections held in a desired relative position by twistable locking means, said locking means comprising a "C" shaped wedging element for placement between a radially inwardly facing surface on one of the tubular sections and a radially outwardly facing surface on the other of the tubular sections, said wedging element having a knurled surface for engagement with one of said radially facing surfaces on the tubular sections, said radially inwardly and outwardly facing surfaces being substantially cylindrical and non-concentric so that a relative rotation of the tubular sections in one direction wedges the wedging element between the radially facing surfaces to squeeze the knurled surface against the one radially facing surface to positively lock the tubular sections against relative longitudinal movement and a relative rotation of the tubular sections opposite to the one direction relatively positions the wedging element and tubular sections so that the sections can be readily shifted longitudinally relative to each of them to permit selection of a desired effective length for the mounting member; and rolling the measuring wheel along substantially the entire length of the mounting member adjusted to permit measuring said length with the mounting member extended longitudinally from a user's hand gripping said hand grip to said surface to measured at an angle to the vertical within the range of approximately 45° to 90° to the surface being measured.

2. The method of measuring distance of claim 1 wherein said mounting member is adjusted to permit measuring of the height of a horizontally facing wall surface with the user being substantially at a minimum distance horizontally from the wall surface when the measuring wheel is disposed at the top of the wall.

3. The method of measuring distance of claim 1 wherein said mounting member is adjusted to permit measuring of the height of a horizontally facing wall surface with the user being substantially at a minimum distance horizontally from the wall surface when the measuring wheel is disposed at the top of the wall and at the bottom of the wall.

4. The method of measuring distance of claim 1 wherein said mounting member is fixedly locked to have a single adjusted length during the entire distance measurement.

5. The method of measuring distance of claim 1 wherein said mounting member is fixedly locked to have a single adjusted length during the entire distance measurement of any one or more of selective measurements of the floor, wall, and ceiling distance.

6. The method of measuring distance of claim 1 wherein said mounting member is fixedly locked to have a single adjusted length during the entire distance measurement, the adjustable length locking thereof comprising the steps of twisting the mounting member to release the mounting member from a previous locked arrangement, adjusting the length of the released mounting member, and twisting the mounting member to relock it in the newly adjusted arrangement.

7. An apparatus for measuring distance selectively along an upwardly facing subjacent surface, a horizontally facing wall surface, and a downwardly facing ceiling surface by any one of a plurality of persons having different heights, comprising:

a rotatable measuring wheel having a counter/indicator for displaying the distance said wheel is rolled along a surface; and a longitudinally adjustably extensible mounting member having a hand grip at one end, and means mounting said measuring wheel and counter/indicator to the opposite end, said mounting member having first and second tubular sections telescopically mated so as to permit selective adjustment of the effective longitudinal extension of the mounting member, said adjacent tubular sections held in a desired relative position by twistable locking means, said locking means comprising a "C" shaped wedging element for placement between a radially inwardly facing surface on one of the tubular sections and a radially outwardly facing surface on the other of the tubular sections, said wedging element having a knurled surface for engagement with one of said radially facing surfaces on the tubular sections, said radially inwardly and outwardly facing surfaces being substantially cylindrical and non-concentric so that a relative rotation of the tubular sections in one direction wedges the wedging element between the radially facing surfaces to squeeze the knurled surface against the one radially facing surface to positively lock the tubular sections against relative longitudinal movement and a relative rotation of the tubular sections opposite to the one direction relatively positions the wedging element and tubular sections so that the sections can be readily shifted longitudinally relative to each of them to permit selection of a desired effective length for the mounting member; and rolling the measuring wheel along substantially the entire length of the mounting member adjusted to permit measuring said length with the mounting member extended longitudinally for a user's hand gripping said hand grip to said surface to be measured at an angle to the vertical within the range of approximately 45° to 90° to the surface being measured.

8. The apparatus for measuring distance of claim 7 wherein said mounting member has a fully extended length of at least 3'.

9. The apparatus for measuring distance of claim 7 wherein said mounting member defines a longitudinal axis and said hand grip comprises a cylindrical hand grip permitting grasping thereof with the hand grip in any position about said longitudinal axis of the mounting member whereby the counter/indicator may be suitably disposed for viewing by the user grasping the hand grip with the mounting member locked in a preselected length arrangement.

10. The apparatus for measuring distance as recited in claim 7 further including a stop positioned on said rod, said stop limiting the relative rotation of said C-shaped wedging element.

* * * * *